United States Patent [19]

Scappatura et al.

[11] Patent Number: 5,857,324
[45] Date of Patent: Jan. 12, 1999

[54] INTERNAL COMBUSTION ENGINE EXHAUST TREATING APPARATUS AND METHOD

[76] Inventors: Dominic E. Scappatura, 604 Highway 654 W., Callandler Ont., Canada, P0h 1H0; Michael Puccini, 2-458 First Ave E, North Bay, On, Canada, P1B 1K3; Brenda M. McLay, 15 Chadbourn Dr., North Bay, On, Canada, P1B 8G2

[21] Appl. No.: 893,621

[22] Filed: Jul. 11, 1997

Related U.S. Application Data

[63] Continuation-in-part of Ser. No. 389,340, Dec. 14, 1995.

[51] Int. Cl.$^6$ .................................................. F01N 3/00
[52] U.S. Cl. ............................... 60/274; 60/298; 60/309; 60/310; 60/311; 60/320
[58] Field of Search .............................. 60/274, 309, 310, 60/311, 320, 298; 165/174, 109.1; 422/261

[56] References Cited

U.S. PATENT DOCUMENTS

| | | | |
|---|---|---|---|
| 3,100,146 | 8/1963 | Huntington | 60/309 |
| 3,782,115 | 1/1974 | Johnson | 60/274 |
| 4,272,958 | 6/1981 | Waltrip | 60/309 |
| 4,656,831 | 4/1987 | Budininkas et al. | 60/309 |
| 5,300,265 | 4/1994 | Banks et al. | 60/298 |

FOREIGN PATENT DOCUMENTS

| | | | |
|---|---|---|---|
| 3322992 | 1/1985 | Germany | 60/309 |
| 35 09 782 A 1 | 10/1986 | Germany . | |
| 195 12 405 A1 | 10/1996 | Germany . | |
| 59-39918 | 3/1984 | Japan | 60/309 |
| 2 264 073 | 8/1993 | United Kingdom . | |
| 96/01411 | 3/1997 | WIPO . | |

*Primary Examiner*—Thomas E. Denion
*Attorney, Agent, or Firm*—Rogers & Milne

[57] ABSTRACT

An apparatus and method for removing gasses and particulate matter from automobile exhaust. The apparatus includes a heat exchanger connected to an automobile exhaust system for cooling exhaust and condensing at least a portion of the exhaust into a liquid condensate. A fluid separator is connected to the heat exchanger and separates the condensate and at least some of the particulate matter from non-condensed gasses. The condensate is passed into a fluid holding tank. The condensate is treated in a first chemical reactor which neutralizes any acids present in the liquid. Non-condensed gasses flow into a second chemical reactor connected to the fluid separator. Gasses are reacted in the second chemical reactor with a substance which absorbs carbon monoxide and carbon dioxide and removes more of the particulate matter. The treated gasses are vented to atmosphere through an exhaust outlet.

15 Claims, 7 Drawing Sheets

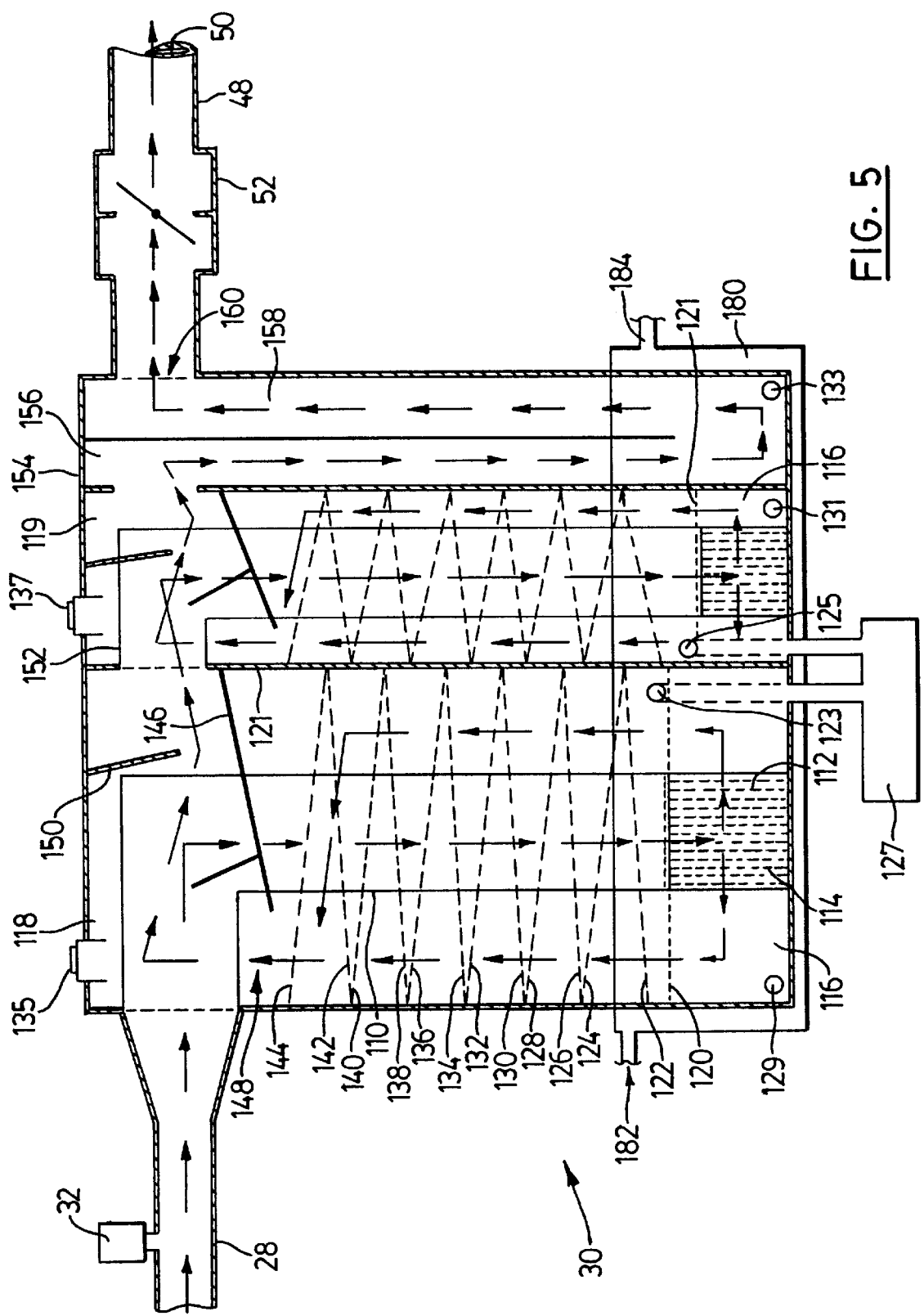

ns in which:

INTERNAL COMBUSTION ENGINE EXHAUST TREATING APPARATUS AND METHOD

This application is a continuation-in-part of application Ser. No. 08/389,340 filed Feb. 14, 1995.

FIELD OF THE INVENTION

This invention relates to the treatment of internal combustion engine exhaust gasses to reduce harmful emissions and more particularly to the removal of carbon monoxide and carbon dioxide from automobile exhaust gasses.

BACKGROUND OF THE INVENTION

The combustion of petrochemical fuel in internal combustion engines generally involves the reaction of air with various hydrocarbons which comprise the fuel. As air is chiefly comprised of oxygen and nitrogen gasses, the resultant products include oxides of nitrogen and carbon and unburned hydrocarbons, the latter generally comprising particulate matter contributing to what is generally referred to as "smog". As petroleum based fuels generally contain sulfur, oxides of sulfur are typically also present in the combustion products.

The oxides of carbon are carbon monoxide and carbon dioxide. Carbon monoxide is undesirable as it is poisonous. Carbon dioxide is undesirable as it is a "greenhouse gas" generally thought to be a primary contributor to global warming.

Conventional exhaust treatment of automobile exhaust utilizes a device known as a "catalytic converter" which reduces the amount of the nitrogen oxides, unburned hydrocarbons and carbon monoxide but tends to increase the amount of carbon dioxide. Accordingly, even with the use of a catalytic converter a significant pollution problem still exists with respect to carbon dioxide.

It is an object of this invention to provide an apparatus and method for treating internal combustion engine exhaust to significantly reduce the amount of carbon dioxide emitted to the atmosphere.

It is also an object of the present invention to provide an apparatus which neutralizes acids present in exhaust gasses.

It is another object of this invention to provide an apparatus which removes particulate matter ("smog") from exhaust gasses.

It is a further object of the present invention to provide such an apparatus as part of an automobile exhaust system.

Other advantages and objects of the present invention will be apparent in the detailed description of preferred embodiments of the invention which is set out below.

SUMMARY OF THE INVENTION

An apparatus for removing gasses and particulate matter from internal combustion engine exhaust, said apparatus comprising:
- a heat exchanger fluidly communicating with an internal combustion engine exhaust system for cooling exhaust passing therethrough and condensing at least a portion of said exhaust into a liquid;
- a fluid separator fluidly communicating with said heat exchanger for separating said liquid from non-condensed gasses and for removing at least some of said particulate matter from said exhaust;
- a holding tank fluidly communicating with said fluid separator for receiving and holding said liquid;
- a first chemical reactor fluidly communicating with at least one of said fluid separator and said holding tank for exposing said liquid to a neutralizing agent to neutralize any acids in said liquid;
- a second chemical reactor fluidly communicating with said fluid separator for receiving non-condensed gasses from said fluid separator and reacting said non-condensed gasses with a substance which absorbs carbon monoxide and carbon dioxide and which removes said particulate matter from said non-condensed gasses; and,
- an outlet fluidly communicating with said second chemical reactor for venting any remaining gasses to atmosphere.

A process for removing gasses and particulate matter from an automobile exhaust, said process comprising the steps of:
i) cooling said exhaust to a temperature of about from 5° to about 10° C. to condense a portion of said exhaust to form a condensate and a non-condensed gas;
ii) reacting said condensate and said non-condensed gas with a neutralizing agent to neutralize any acids in said condensate;
iii) separating said condensate and said particulate matter from said non-condensed gas;
iv) storing said condensate in a holding tank;
v) exposing said non-condensed gas to a substance which removes said particulate matter therefrom and which absorbs carbon monoxide and carbon dioxide to remove said particulate matter, carbon monoxide and carbon dioxide from said non-condensed gas to form a treated exhaust gas;
vi) venting said treated exhaust gas to atmosphere.

DESCRIPTION OF DRAWINGS

Preferred embodiments of the invention are described below with reference to the accompanying drawings in which:

FIG. 5 is a section through a second chemical reactor of an apparatus according to the present invention;

DESCRIPTION OF PREFERRED EMBODIMENTS

Figure 1:
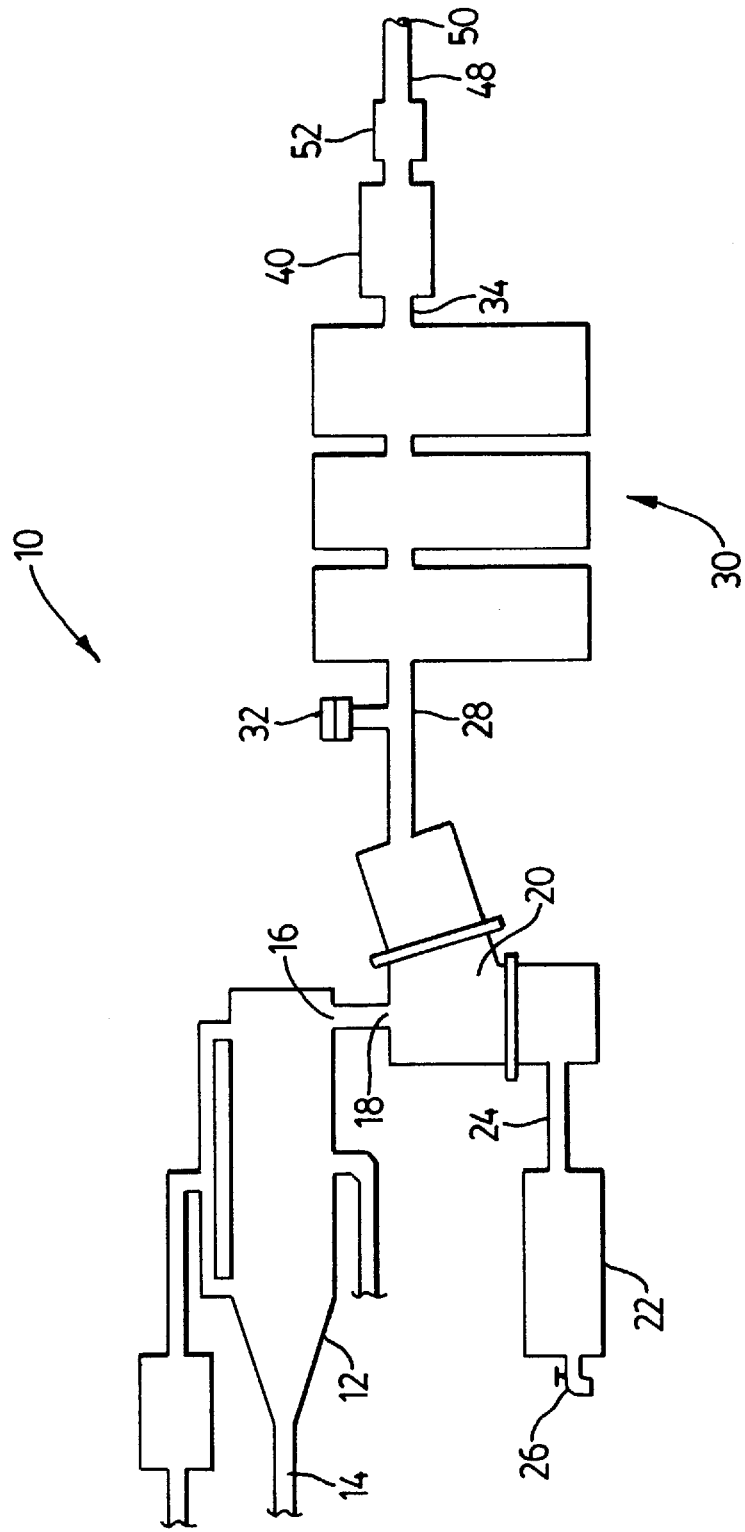
FIG. 1 is a schematic representation of an internal combustion engine exhaust treating apparatus according to the present invention.

An apparatus according to the present invention for removing waste materials from internal combustion engine exhaust is generally indicated in FIG. 1 by reference 10. As one application for this invention is the treatment of automobile exhaust, the following description makes reference to "automobile" exhaust and describes how the invention may be integrated with an automobile. It should be noted that there are many applications for internal combustion engines other than in automobiles and it is intended that the present invention may be utilized on such non-automobile applications. Accordingly the reference to "automobile" should, as far as reasonable in the context, be interpreted as illustratively rather than restrictively.

The apparatus 10 has a heat exchanger 12, which fluidly communicates, through an inlet 14, with an automobile exhaust system and would typically be connected aft of a catalytic converter. The heat exchanger 12 cools the incoming exhaust gasses resulting in condensation of a portion of the gasses into a liquid "condensate". The condensate will principally be water which typically is formed as a product in the combustion of hydrocarbon fuels. As oxides of nitrogen and sulfur are also present in the combustion products, these will combine with the condensed water vapour to form nitrogen and sulfur oxide based acids, including nitric and sulfuric acids.

The cooled gasses and condensate exit the heat exchanger 12 through an outlet 16 which fluidly communicates with an inlet 18 into a fluid separator 20. The fluid separator 20 separates the condensate from non-condensed gasses. Condensate collects in the bottom of the fluid separator 20 from where it drains into a holding tank 22 which fluidly communicates with the fluid separator through a fluid conduit 24. The condensate is neutralized by coming into contact with a neutralizing agent in a first chemical reactor which may form part of the fluid separator 20 or the holding tank 22. A drain 26 is provided for draining neutralized condensate from the holding tank 22.

Non-condensed gasses pass from the fluid separator 20 into a second chemical reactor 30 through a fluid conduit 28 which provides fluid communication between the separator 20 and the second chemical reactor 30. An air inlet 32 is provided into the fluid conduit 28 to admit air into the apparatus in the event that a below ambient pressure should occur in the apparatus. It has been found that sudden acceleration or deceleration of the vehicle to which the apparatus 10 is attached may give rise to sudden pressure drops within the apparatus which result in a partial vacuum causing the air inlet 32 to open.

The second chemical reactor 30 receives non-condensed gasses from the fluid separator 20 which will contain carbon monoxide and carbon dioxide resulting from the combustion of hydrocarbon fuels and possibly also from the neutralization reaction in the first chemical reactor from the neutralizing agent. The second chemical reactor 30 reacts the carbon monoxide and carbon dioxide with a substance which absorbs carbon monoxide and carbon dioxide and removes particulate matter.

Treated exhaust gasses may be passed from the second reactor 30 into a final scrubber 40, if one is provided, through a fluid conduit 34 which provides fluid communication therebetween. The final scrubber 40 contains soda ash which reacts with and neutralizes residual acids in the treated exhaust gasses. Depending on the efficiency of the second chemical reactor 30, a final scrubber 40 may not be necessary and indeed none is illustrated in FIG. 5.

Treated and scrubbed exhaust gasses pass out of the final scrubber 40 and are vented to atmosphere through an exhaust outlet 50 which fluidly communicates with the final scrubber 40 through an outlet conduit 48. A blocker valve 52 is provided in the outlet conduit 48 which closes when the automobile to which the apparatus 10 is connected is not running thereby preventing carbon dioxide and carbon monoxide from entering the apparatus 10 from outside.

Figure 2:
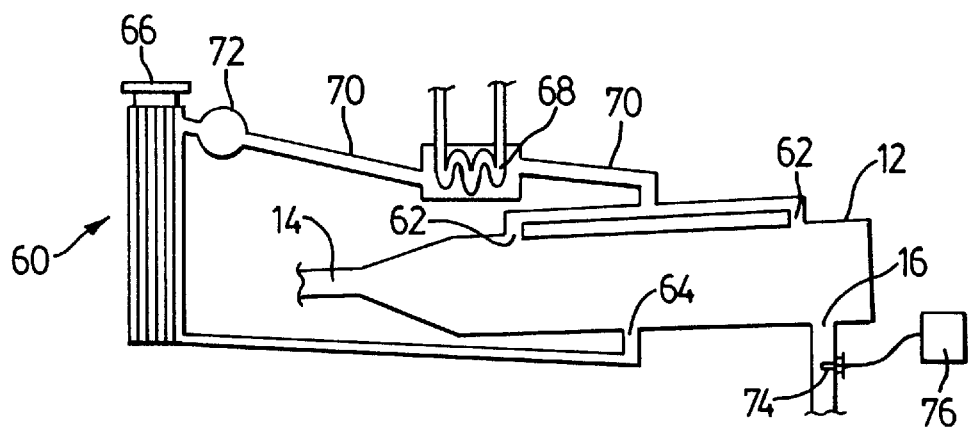
FIG. 2 is a schematic representation of a heat exchanger of an apparatus according to the present invention.

The various components of the overall apparatus will now be described in more detail. FIG. 2 illustrates the connection of the heat exchanger 12 to an automobile cooling system generally indicated by reference 60. Preferably the heat exchanger 12 should reduce the exhaust temperature to a temperature of from about 5°–10° C. (approximately 40°–50° F.). In cold weather this can be accomplished by connecting a coolant inlet 62 and coolant outlet 64 of the heat exchanger 12 to a radiator 66 which may be portioned off or entirely separate from the radiator which cools the automobile engine.

As the radiator 66 cannot cool coolant below ambient temperature, a further source of cooling is required in warm weather. This can be provided by an air conditioning unit on the automobile. Reference 68 indicates an evaporator coil in an air conditioning unit for cooling coolant flowing through a coolant conduit 70 providing fluid communication between the coolant inlet 62 of the heat exchanger and the radiator 66.

A coolant pump 72 is provided in the coolant conduit 70. The operation of the coolant pump 72 is controlled by a control system 76 which monitors the temperature of the gas/condensate exiting the outlet 16 of the heat exchanger 12. Depending on the nature of the specific control system 76 and pump 72 selected, the control system can either vary pump speed or simply turn the pump on and off as required to maintain the temperature of the condensate/gas exiting the outlet 16 within the desired range. A temperature sensor 74 may be mounted at a suitable location such as, for example, adjacent the outlet 16 to provide a temperature indicating signal to the control system 76.

Figure 4:
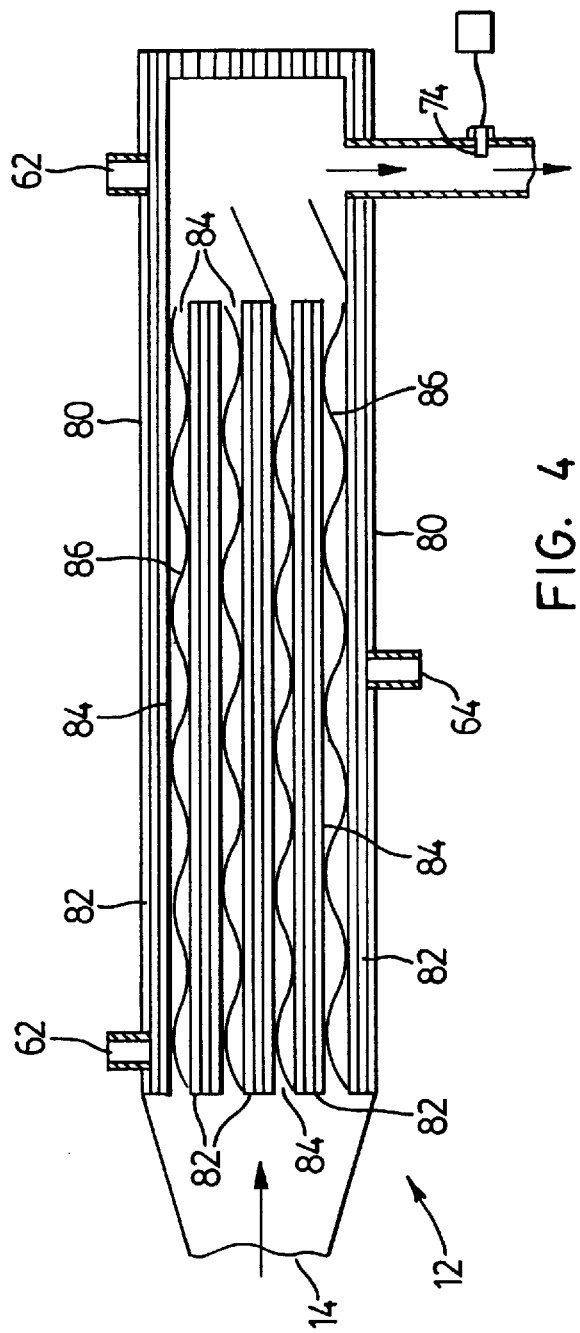
FIG. 4 is a section through the heat exchanger portion of FIG. 2.

FIG. 4 shows a cross section through the heat exchanger 12. The components of the heat exchanger 12 exposed to exhaust gasses are preferably manufactured from a heat and corrosion resistant material such as stainless steel. The heat exchanger 12 has a shell or casing 80 containing a coolant chamber 82.

The coolant chamber 82 fluidly intercommunicates with a coolant inlet 62 and a coolant outlet 64 so that coolant fluid entering the coolant inlets 62 will pass through the coolant chamber 82 to emerge from the coolant outlet 64.

The coolant chamber 82 extends around exhaust tubes 84 which receive hot exhaust gasses from the inlet 14 to the heat exchanger 12. The exhaust tubes 84 fluidly communicate with the inlet 14 and outlet 16 of the heat exchanger 12. Heat from the exhaust entering the inlet 14 is transmitted through the walls of the exhaust tubes 84 into the coolant fluid contained within the coolant chamber 82. The total cross-sectional area of the exhaust tubes should be adequate to minimize flow restriction through and attendant back pressure associated with the heat exchanger 12.

Spiral baffles 86 may be provided in the exhaust tubes 84 to promote swirling of the exhaust passing through the tubes and to conduct heat from the exhaust gasses into the coolant chamber 82 thereby promoting heat transfer and enhancing the efficiency of the heat exchanger 12.

Figure 3:
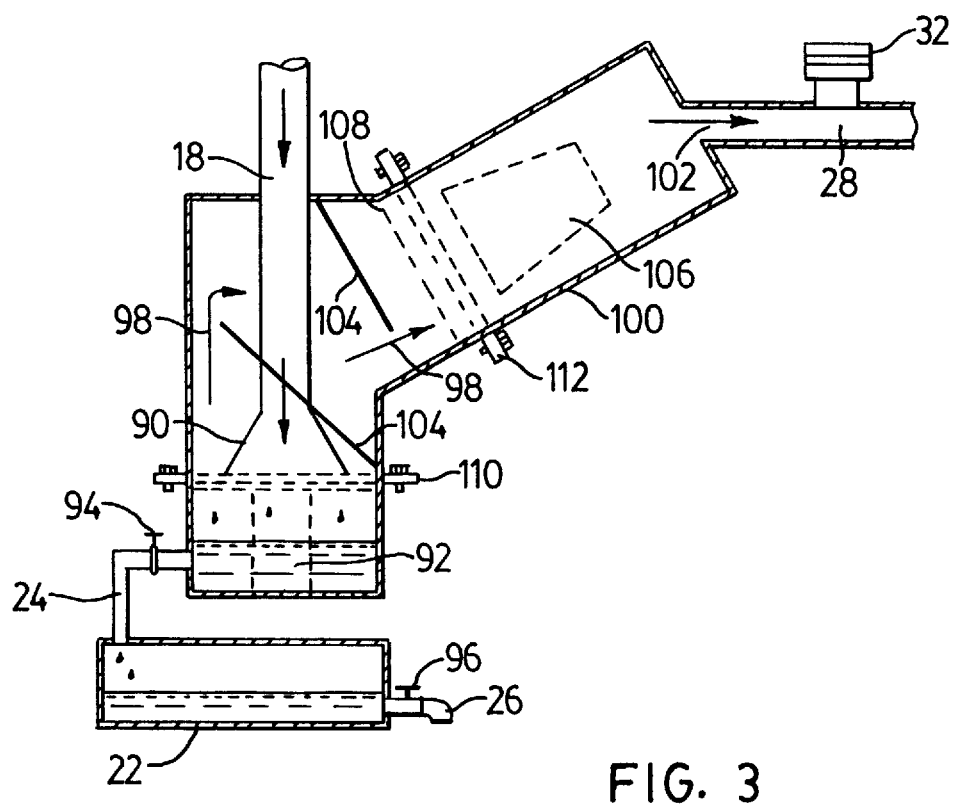
FIG. 3 is a section through a first chemical reactor, a fluid separator and a fluid holding tank of an apparatus according to the present invention.

FIG. 3 shows a cross section through the fluid separator 20 and fluid holding tank 22. Condensate/gas emanating from the outlet 16 of the heat exchanger 12 is directed into the bottom of the fluid separator 20 from the inlet 18 by a funnel shaped inlet guide 90. Blocks of a suitable neutralizing agent such as sodium carbonate ("soda ash") 92 are located at the bottom of the fluid separator 20 in the stream of condensate/gas emanating from the inlet guide 90. The soda ash blocks 92 react with the acidic condensate to neutralize acids in the condensate. The neutralized condensate flows into the holding tank 22 through the fluid conduit 24. A one way drain valve 94 is provided in the fluid conduit 24 to prevent return of the neutralized condensate from the holding tank 22 into the fluid separator 20.

The condensate may be periodically drained from the holding tank 22 through the drain 26. A valve 96 is provided in the drain 26 to open and close the drain 26.

Although the soda ash blocks 92 are shown in the fluid separator, alternatively or additionally, soda ash may be provided in the holding tank 22. The placement of soda ash in association with the fluid separator 20 and/or the holding tank 22 provides a first chemical reactor for neutralizing acids in the condensate.

Non-condensed gasses pass upwardly in the direction of arrows 98 into a branch 100 of the fluid separator toward an outlet 102. Baffles 104 are provided in the gas flow path to trap condensate carried in the gas. As the velocity of the exhaust diminishes and as it changes direction through the fluid separator, particulate matter tends to separate from the exhaust in the fluid separator and settle out with the condensate.

A further soda ash block 106 may be provided in the branch 100 as part of the first chemical reactor to react with any condensate carried by the gas flow into the branch 100. A stainless steel mesh screen 108 is provided across the branch 100 to prevent the soda ash block 106 from falling into the bottom of the separator 20.

Flanges 109 and 111 are provided in the fluid separator 20 to allow disassembly for replacement of the soda ash blocks 92 and 106 respectively.

Treated gas exits the branch 100 of the separator through the fluid conduit 28 into the second chemical reactor 30 such as shown in a detailed sectional view in FIG. 5. The exhaust is directed to the bottom of the second chemical reactor 30 by an inlet pipe 110 which may be made of corrosion resistant plastic (for example PVC) as the exhaust is relatively cool by this stage and plastic is quite resistant to any residual corrosive materials in the exhaust.

The inlet pipe 110 is perforated at its lowermost end 112 by a plurality of small holes 114 to radically disperse the non-condensed gasses into a liquid 116 surrounding the pipe. The liquid would typically be a suitable alkaline solution such as a 50 wt % potassium hydroxide/water solution. It is expected that the amount of potassium hydroxide (for example) could be varied from about 10% to about 100% depending on application requirements. Other hydroxides such as sodium and possibly lithium hydroxide may also work. Generally, the effectiveness of a hydroxide solution in removing carbon dioxide and carbon monoxide will increase with the amount of hydroxide in solution.

The holes 114 extend up the end 112 of the pipe a distance corresponding to approximately the outside diameter of the inlet pipe 110 and the total area of the holes 114 should be approximately twice the cross-sectional area of the inside of the inlet pipe 110 to minimize flow restriction. The actual size and number of holes may vary somewhat in practice with the overall object being to provide enough hole area to minimize flow restriction with small enough holes to provide good dispersion of gas into the liquid 116 within the second reactor 30 without tending to force the liquid 116 out of the reactor 30. Typically the holes may be on the order of ⅛ in. (approx. 3 mm. in diameter).

The second reactor 30 has a first stage 118 to the left as illustrated in FIG. 5 which is fluidly isolated from a second stage 119, to the right as illustrated by a partition 121 extending up to the height of an upper baffle 146. A series of inclined baffle plates 120, 122, 124, 126, 128, 130, 132, 134, 136, 138, 140, 142 and 144 extend across the first stage 118, one above another in a zig-zag configuration except for the baffle plate 120 which is generally horizontally disposed. The inlet pipe 110 may extend down through the center of the baffle plates 120 through 144.

The level of liquid 116 should be between the uppermost of the holes 114 and the underside of the baffle plate 120.

The baffle plates 120 through 144 are perforated to allow the upward passage of gas bubbles through the first stage 118. Typically the number of the holes would be greater and their respective sizes smaller the closer the respective of baffles 120 through 140 is to the bottom of the first stage. The overall total area of holes in each baffle should be at least 1¾ times the cross sectional area of the inside of the pipe 110 to minimize flow restriction. Typical hole sizes may be in the following ranges:

| Baffle No. | Hole Size |
| --- | --- |
| 120 | 3/32 in. (approx. 2 mm.) |
| 122, 124 | 1/8 in. (approx. 2 mm.) |
| 126, 128 | 3/16 in. (approx. 2 mm.) |
| 130, 132 | 3/8 in. (approx. 2 mm.) |
| 134, 136, 138, 140, 142, 144 | 1/2 in. (approx. 2 mm.) |

The upper baffle 146 is not perforated and extends from the partition 121 only partially across the first stage 118 to leave a gap 148 past which bubbled gas may flow. The gap should have an area of at least 1¾ times the cross sectional area of the inside of the pipe 110 to minimize flow restriction. Bubbled gas flows across the top of the first stage 118 below a deflector plate 150 and into a transfer pipe 152, similar to the inlet pipe 110, down into the bottom of the second stage 119.

Except for being only about half of the breadth of the first stage 118, the second stage is structurally and functionally similar to the first stage 118 and accordingly operates much the same as the first stage 118. Gas exits the transfer pipe 152 and travels up through perforated baffle plates, across the top of the second stage 119 and into a final stage 154. The same liquid 116 as used in the first stage 118 is used in the second stage 119.

The liquid level in the second chemical reactor 30 should be maintained below a lowermost generally horizontal baffle plate 120. In order to maintain the level of the liquid 116 in the first stage 118 and second stage 119, respective overflow outlets 123 and 125 may be provided which fluidly communicate with an overflow reservoir 127 to drain off any liquid 116 rising above the level of the overflow outlets 123 and 125.

Drain outlets 129, 131 and 133 respectively may be provided at the bottoms of the first stage 118, second stage 119 and final stage 154 to drain any fluid from those stages. Additional or replacement liquid 116 may be introduced into the first stage 118 and second stage 119 through respective capped openings 135 and 137 at their tops. Alternatively a solid chemical may be added to replace chemical consumed in the reaction.

In the final stage 154, gas is forced down a first passage 156, across the bottom of the final stage to a second passage 158 and up the second passage 158 to an exit aperture 160. This deposits any moisture at the bottom of the final stage 154.

Particulate matter carried by the non-condensed gas will be trapped in the liquid 116 as the passage of the non-condensed gas through the liquid 116 and baffle plates 120–144 tends to "wash" particulate matter from the treated gas.

The absorption of carbon monoxide and carbon dioxide by the liquid 116 is an exothermic reaction. To prevent unwanted heating up of the second chemical reactor 30, a coolant jacket 180 is provided around the base of the second chemical reactor 30. The coolant jacket 180 has an inlet 182 and an outlet 184 for respectively receiving and returning coolant to the same coolant source as used for the heat exchanger 12.

With use, the hydroxide in the hydroxide solution will be consumed through reaction with carbon dioxide. In order to maintain a suitable hydroxide concentration in the liquid 116, a chemical replenisher 190 in FIGS. 9 and 10 may be connected to the second reactor 30. The chemical replenisher 190 has a chemical outlet 192 which communicates with the interior of the second chemical reactor 30, preferably below the lowermost baffle plate 120.

The chemical replenisher further includes a chemical storage chamber 194 for storing concentrated hydroxide 195 which communicates with the chemical outlet 192 through a metering and transfer device 196. The metering and transfer device 196 periodically transfers a predetermined amount of concentrated hydroxide 195 into the liquid 116 to replenish the hydroxide consumed by the reaction of the liquid 116 with carbon dioxide.

Figure 9:
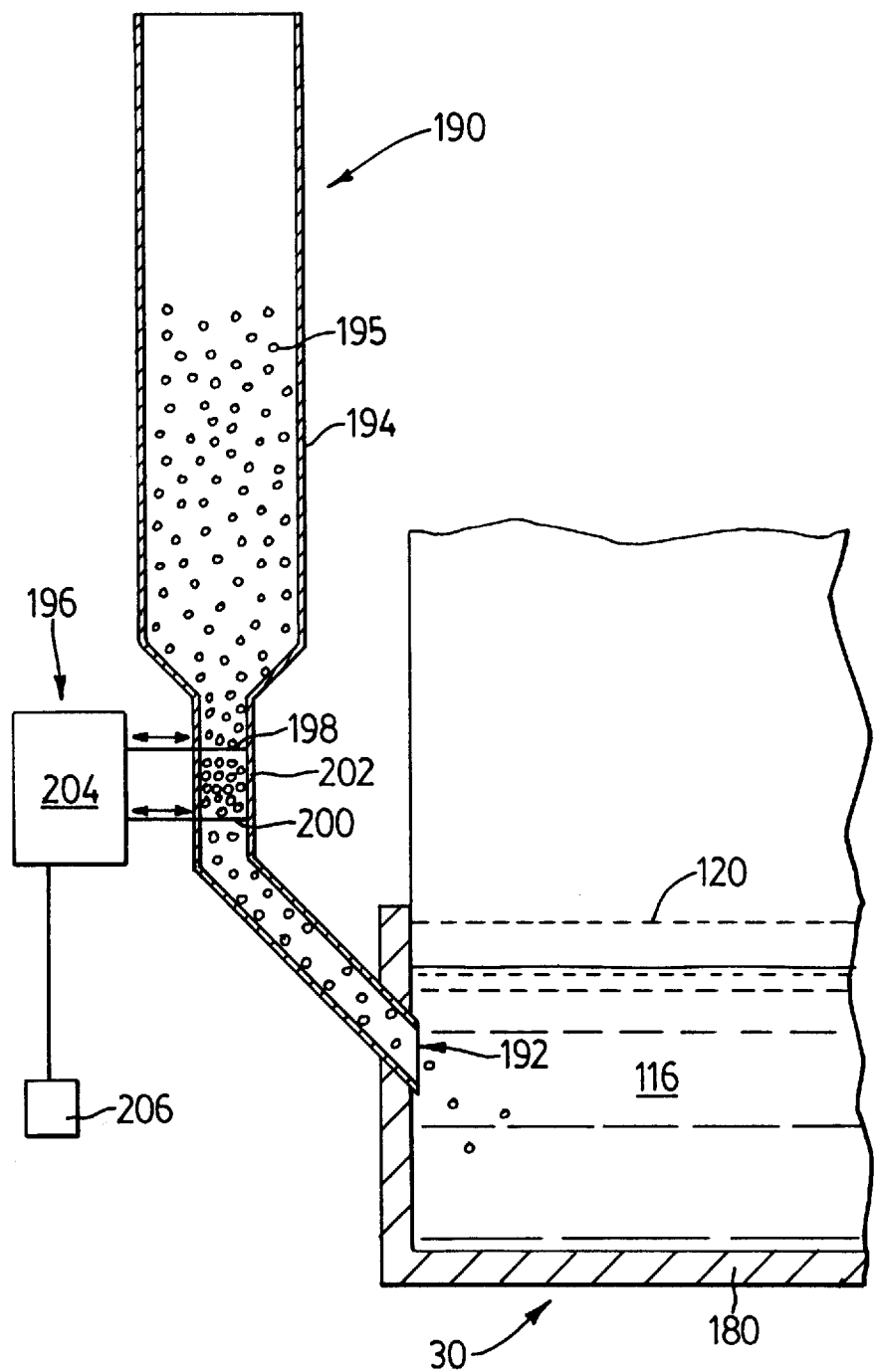
FIG. 9 is a section through a chemical replenisher according to one aspect of the present invention.

FIG. 9 illustrates one embodiment of a chemical replenisher 190 which utilizes solid hydroxide pellets as the concentrated hydroxide 195. The metering and transfer device 196 utilized by such an arrangement may take any of numerous suitable forms as would no doubt be apparent to one skilled in such devices. By way of example, the metering and transfer device 196 illustrated in FIG. 9 includes a pair of gate valves, 198 and 200 mounted one above the other so as to define a metering chamber 202 therebetween. An activator 204 is connected to the gate valves 198 and 200 to sequentially open the gate valve 198, close the gate valve 198, open the gate valve 200 and close the gate valve 200.

It will be appreciated that the sequential activation allows a portion of the hydroxide pellets 195 to fall by gravity from the chemical storage chamber 194 into the metering chamber 202 and to subsequently fall into the liquid 116 through the chemical outlet 192. As the gate valves 198 and 200 are never open simultaneously, the liquid 116 is prevented from being forced through the metering and transfer device 196 into the chemical storage chamber 194.

The metering and transfer device 196 may further be provided with a controller 206 which receives input for example from the vehicle ignition system or odometer to determine appropriate periods for chemical replenishment and controls the operation of activator 204 of the metering and transfer device 196 accordingly.

Figure 10:
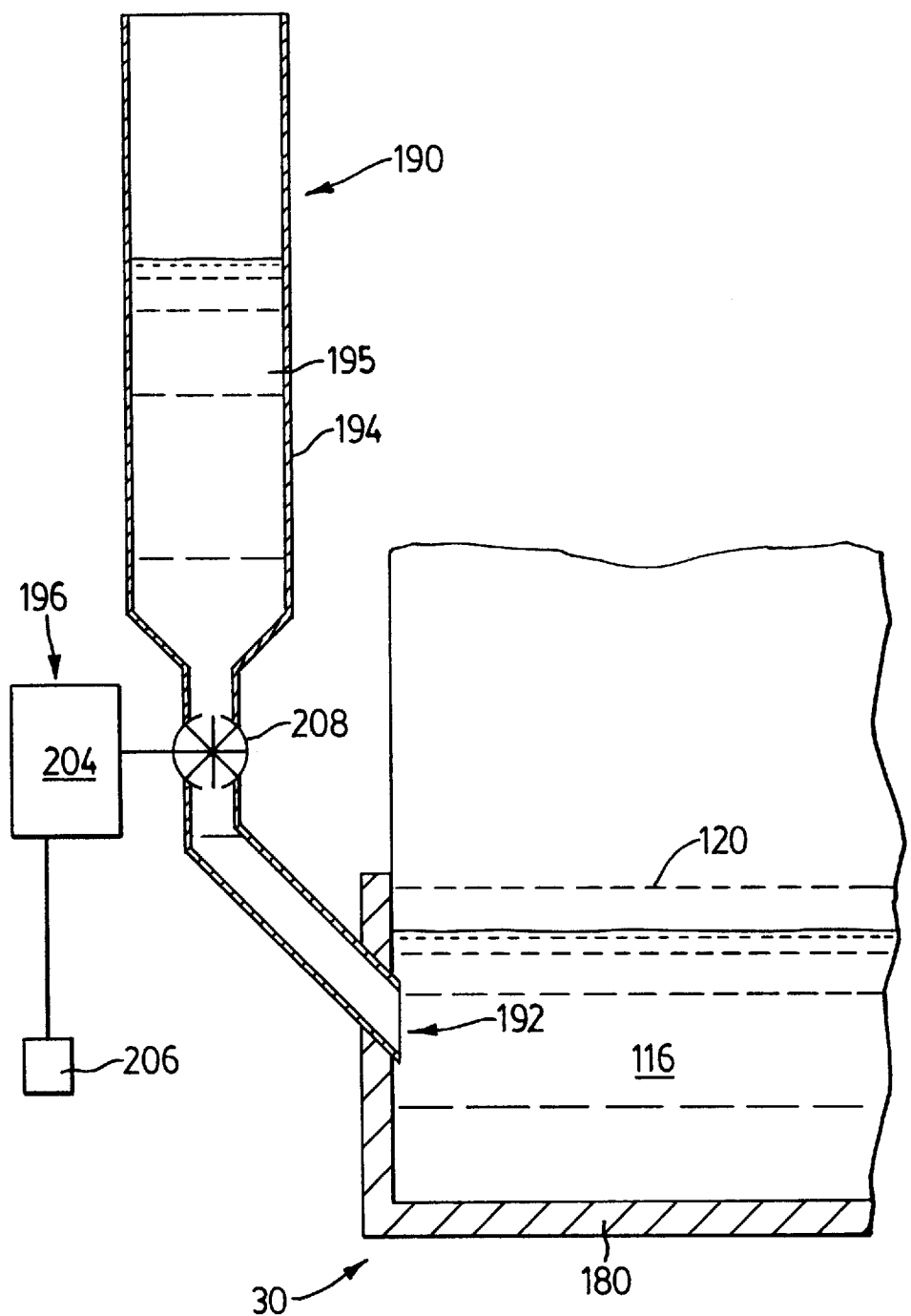
FIG. 10 is a section through an alternate embodiment chemical replenisher according to one aspect of the present invention.

FIG. 10 illustrates an alternate embodiment chemical replenisher 190 which in most respects is similar to the FIG. 9 embodiment with the principal difference being that the concentrated chemical 195 is in liquid form in a concentrated solution rather than in solid pelletized form. Also, the metering and transfer device 196 utilizes a pump 208 in lieu of a pair of gate valves 198 and 200 respectively.

It will be appreciated that alkali metal hydroxides are corrosive and accordingly non-reactive or corrosion resistant materials should be selected for the components of the chemical replenisher 190 which may come into contact with the concentrated chemical 195 or liquid 116.

Although a three stage second chemical reactor 30 is illustrated and described, it should be appreciated that the actual number of stages may be increased or decreased depending as required by any particular application. For example, the final stage 154 may not be required at all in some applications, particularly where relatively small gas volumes and flow rates are expected. Furthermore, a plurality of smaller second stage reactors 30 may be utilized in lieu of a single larger unit.

In some applications it may be desirable to use a solid substance for absorbing carbon dioxide in lieu of the liquid 116.

The exhaust passes through the exit aperture 160, through the optional final scrubber 40 (not shown in FIG. 5), through the blocker 52, through the outlet conduit 48 and exits the apparatus 10 through the exhaust outlet 50.

Figure 6:
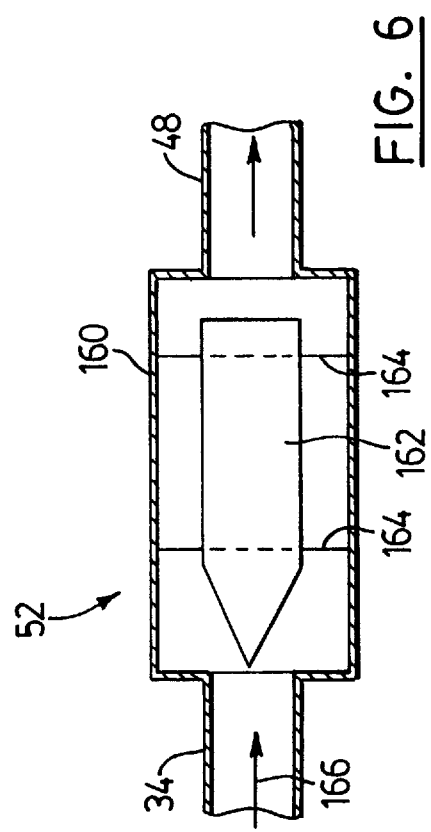
FIG. 6 (which appears on the same page as FIG. 4) is a section through a final scrubber of an apparatus according to the present invention.

A cross section through the final scrubber is shown in FIG. 6. The final scrubber essentially comprises a cylindrical casing 160 in which a block of soda ash 162 is suspended by support legs 164 in the path of the gas flow shown by an arrow 166.

Figure 7:
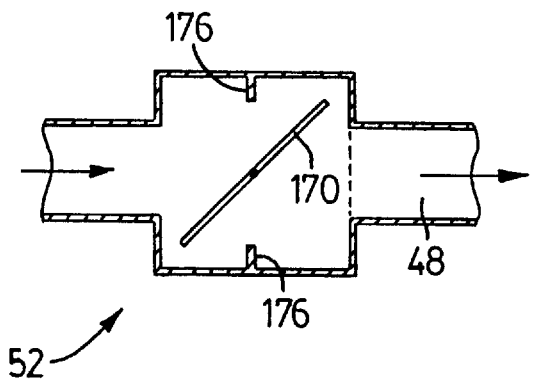
FIG. 7 is a section through an exhaust blocker of an apparatus according to the present invention in its open position; and, FIG. 8 is a section through an exhaust blocker according to the present invention in its closed position.
Figure 8:
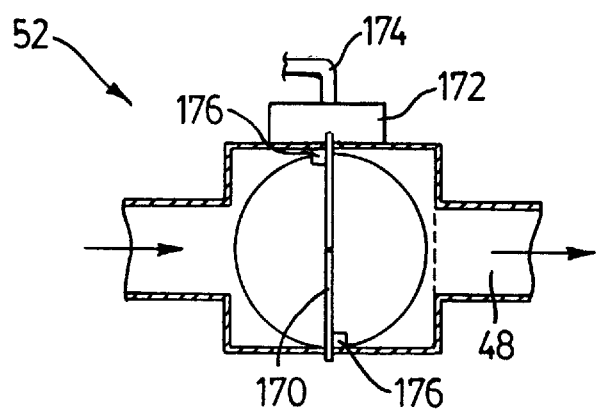

The blocker 52, as shown sectionally in FIGS. 7 and 8 may be a butterfly valve 170 activated by an electrical motor 172 in FIG. 8 which receives input from the automobile's electrical system. The motor 172 opens the butterfly valve 170 as shown in FIG. 7 when the automobile ignition is switched on and closes the butterfly valve 170 as shown in FIG. 8 when the ignition is switched off. Reference 174 in FIG. 8 schematically shows the electrical connection of the motor 172 to the automobile's electrical system. Stops 176 are provided against which the butterfly valve 170 abuts when the butterfly valve 170 is closed.

The present invention is further illustrated by the examples which follow.

EXAMPLE 1

Three exhaust samples ("Bags 1, 2 and 3") were taken from a 1996 model year Pontiac Sunbird™ automobile mounted on a stationary test bed to simulate the automobile travelling under urban and highway conditions on a roadway. The catalytic converter was removed. The samples of raw exhaust were analyzed and the results are tabulated as follows:

Test Results:

|  | Temp | Pressure | Dew Point | KH | DF | SCF | Dist |
|---|---|---|---|---|---|---|---|
| Bag 1 | 21.42 | 101.06 | 5.40 | .85 | 14.05 | 2723.77 | 3.55 |
| Bag 2 | 22.01 | 101.09 | 5.46 | .86 | 21.20 | 4650.39 | 3.84 |
| Bag 3 | 19.06 | 101.11 | 4.87 | .85 | 15.70 | 2728.24 | 3.54 |

|  | CO | $CO_2$ | NOx | HC |
|---|---|---|---|---|
| Bag 1 |  |  |  |  |
| Ranges | 5 | 4 | 2 | 3 |
| Sample Conc | 488.94 | .89 | 79.48 | 104.45 |
| Ambient Conc | 8.89 | .05 | .79 | 7.55 |
| Mass | 43.11 | 1201.67 | 9.93 | 4.33 |
| Grams/mile | 12.14 | 338.36 | 2.80 | 1.22 |
| Fuel Consumption | (1/100 km) | 9.52 |  |  |
| Bag 2 |  |  |  |  |
| Ranges | 4 | 3 | 2 | 2 |
| Sample Conc | 301.51 | .60 | 36.87 | 60.53 |
| Ambient conc | 7.74 | .04 | .38 | 6.10 |
| Mass | 45.04 | 1336.13 | 7.87 | 4.15 |
| Grams/mile | 11.74 | 348.21 | 2.05 | 1.08 |

| | -continued | |
|---|---|---|
| Fuel Consumption | (l/100 km) | 9.75 |
| Bag 3 | | |
| Ranges | 5 3 2 2 | |
| Sample Conc | 439.68 .80 66.90 70.67 | |
| Ambient Conc | 9.91 .04 .69 5.95 | |
| Mass | 38.66 1078.08 8.32 2.90 | |
| Grams/mile | 10.92 304.60 2.35 .82 | |
| Fuel Consumption | (l/100 km) 8.54 | |
| Composite Grams/mile | 11.60 334.25 2.29 1.04 | |
| Fuel Consumption | (l/100 km) 9.37 | |

| Quality Control Printout Meter Readings Bag 1 | | | | |
|---|---|---|---|---|
| | CO | $CO_2$ | NOx | HC |
| Pre zero | .48 | −.04 | −.46 | .26 |
| MFC Reading | 1.98 | 1.97 | 3.98 | 3.98 |
| Pre span | 98.62 | 84.86 | 94.26 | 90.63 |
| MFC Reading | 1.98 | 1.97 | 3.98 | 3.98 |
| Raw Samp | 30.75 | 25.79 | 78.66 | 34.86 |
| MFC Reading | 1.98 | 1.97 | 3.98 | 3.98 |
| Raw Amb | .99 | 1.41 | .26 | 2.75 |

EXAMPLE 2

An apparatus according to the present invention was connected to the exhaust system of the vehicle with the catalytic converter still removed. The test procedure of Example 1 was reproduced and three further samples (Bags 1, 2 and 3) were taken and analyzed. The results of the analysis are as follows:

Test Results:

| | Temp | Pressure | Dew Point | KH | DF | SCF | Dist |
|---|---|---|---|---|---|---|---|
| Bag 1 | 21.83 | 101.37 | 4.17 | .84 | 52.96 | 2754.65 | 3.58 |
| Bag 2 | 24.16 | 101.37 | 4.65 | .85 | 88.89 | 4695.24 | 3.89 |
| Bag 3 | 26.40 | 101.42 | 4.49 | .85 | 66.22 | 2743.24 | 3.56 |

| | CO | $CO_2$ | NOx | HC |
|---|---|---|---|---|
| Bag 1 | | | | |
| Ranges | 4 | 3 | 2 | 2 |
| Sample Conc | 349.32 | .21 | 26.84 | 66.49 |
| Ambient Conc | 14.67 | .05 | .63 | 6.99 |
| Mass | 30.49 | 227.80 | 3.30 | 2.68 |
| Grams/mile | 8.53 | 63.71 | .92 | .75 |
| Fuel Consumption (l/100 km) | 2.09 | | | |
| Bag 2 | | | | |
| Ranges | 4 | 3 | 1 | 2 |
| Sample Conc | 212.13 | .13 | 9.37 | 42.27 |
| Ambient Conc | 17.93 | .06 | .65 | 6.90 |
| Mass | 30.19 | 156.82 | 1.88 | 2.72 |
| Grams/mile | 7.77 | 40.36 | .48 | .70 |
| Fuel Consumption (l/100 km) | 1.44 | | | |
| Bag 3 | | | | |
| Ranges | 4 | 3 | 1 | 2 |
| Sample Conc | 296.27 | .17 | 19.85 | 49.38 |
| Ambient Conc | 14.22 | .06 | .45 | 6.23 |
| Mass | 25.59 | 159.91 | 2.44 | 1.94 |
| Grams/mile | 7.19 | 44.91 | .69 | .54 |
| Fuel Consumption (l/100 km) | 1.53 | | | |
| Composite Grams/mile | 7.77 | 46.41 | .63 | .67 |
| Fuel Consumption (l/100 km) | 1.60 | | | |
| Quality Control Printout | | | | |
| Meter Readings | | | | |
| Bag 1 | | | | |

| | -continued | | | |
|---|---|---|---|---|
| Pre zero | .33 | −.23 | −.27 | .50 |
| MFC Reading | 2.01 | 1.97 | 3.98 | 3.98 |
| Pre Span | 96.77 | 92.17 | 94.78 | 90.63 |
| MFC Reading | 2.02 | 1.97 | 3.99 | 3.99 |
| Raw Samp | 47.59 | 12.72 | 26.41 | 66.38 |
| MFC Reading | 2.01 | 1.97 | 3.98 | 3.98 |
| Raw Amb | 2.71 | 3.08 | .35 | 7.39 |

EXAMPLE 3

The apparatus according to the present invention was removed from the vehicle and the catalytic converter was reinstalled. The test procedure of Example 1 was followed and three samples (Bags 1, 2 and 3) were taken and analyzed. The results of the analysis are as follows:

Test Results:

| | Temp | Pressure | Dew Point | KH | DF | SCF | Dist |
|---|---|---|---|---|---|---|---|
| Bag 1 | 18.20 | 100.07 | 5.87 | .86 | 13.75 | 2706.66 | 3.57 |
| Bag 2 | 19.15 | 100.06 | 6.41 | .87 | 20.24 | 4616.80 | 3.87 |
| Bag 3 | 19.57 | 100.08 | 5.39 | .86 | 15.20 | 2702.09 | 3.56 |

| | CO | $CO_2$ | NOx | HC |
|---|---|---|---|---|
| Bag 1 | | | | |
| Ranges | 3 | 4 | 1 | 2 |
| Sample Conc | 151.08 | .95 | 14.85 | 44.25 |
| Ambient Conc | 6.09 | .05 | .52 | 8.25 |
| Mass | 12.94 | 1280.34 | 1.81 | 1.62 |
| Grams/mile | 3.63 | 358.99 | .51 | .45 |
| Fuel Consumption (l/100 km) | 9.65 | | | |
| Bag 2 | | | | |
| Ranges | 1 | 3 | 1 | 1 |
| Sample Conc | 18.96 | .66 | 2.15 | 7.92 |
| Ambient Conc | 6.01 | .04 | .34 | 5.90 |
| Mass | 1.97 | 1478.29 | .39 | .17 |
| Grams/mile | .51 | 381.63 | .10 | .04 |
| Fuel Consumption (l/100 km) | 10.08 | | | |
| Bag 3 | | | | |
| Ranges | 3 | 3 | 1 | 1 |
| Sample Conc | 115.20 | .87 | 7.16 | 13.98 |
| Ambient Conc | 6.44 | .04 | .31 | 5.47 |
| Mass | 9.69 | 1161.57 | .86 | .39 |
| Grams/mile | 2.72 | 325.87 | .24 | .11 |
| Fuel Consumption (l/100 km) | 8.71 | | | |
| Composite Grams/mile | 1.76 | 361.73 | .22 | .15 |
| Fuel Consumption (l/100 km) | 9.61 | | | |
| Quality Control Printout | | | | |
| Meter Readings | | | | |
| Bag 1 | | | | |
| Pre zero | .78 | .05 | .51 | 1.39 |
| MFC Reading | 2.01 | 1.97 | 3.98 | 3.98 |
| Pre Span | 88.48 | 84.46 | 90.84 | 90.04 |
| MFC Reading | 2.01 | 1.97 | 3.97 | 3.98 |
| Raw Samp | 55.11 | 27.29 | 49.63 | 44.35 |
| MFC Reading | 2.01 | 1.97 | 3.98 | 3.98 |
| Raw Amb | 3.05 | 1.45 | 2.24 | 9.32 |

EXAMPLE 4

An apparatus according to the present invention was connected to the automobile exhaust aft of the catalytic converter. The vehicle was once again operated according to the procedure followed in Example 1 and three further exhaust samples (Bags 1, 2 and 3) were taken and analyzed. The results of the analysis are as follows:

Test Results:

| | Temp | Pressure | Dew Point | KH | DF | SCF | Dist |
|---|---|---|---|---|---|---|---|
| Bag 1 | 18.00 | 102.63 | 1.00 | .82 | 53.12 | 2790.04 | 3.59 |
| Bag 2 | 18.25 | 102.61 | 1.90 | .83 | 97.07 | 4762.74 | 3.86 |
| Bag 3 | 18.51 | 102.58 | 1.46 | .82 | 75.81 | 2787.05 | 3.56 |

| | CO | $CO_2$ | NOx | HC |
|---|---|---|---|---|
| Bag 1 | | | | |
| Ranges | 3 | 3 | 1 | 2 |
| Sample Conc | 176.05 | .23 | 7.58 | 33.18 |
| Ambient Conc | 13.64 | .06 | .42 | 5.26 |
| Mass | 14.94 | 255.60 | .89 | 1.28 |
| Grams/mile | 4.17 | 71.29 | .25 | .36 |
| Fuel Consumption (l/100 km) | 2.08 | | | |
| Bag 2 | | | | |
| Ranges | 1 | 3 | 1 | 1 |
| Sample Conc | 20.62 | .14 | .62 | 5.94 |
| Ambient Conc | 8.04 | .06 | .09 | 3.98 |
| Mass | 1.98 | 182.16 | .11 | .16 |
| Grams/mile | .51 | 47.14 | .03 | .04 |
| Fuel Consumption (l/100 km) | 1.27 | | | |
| Bag 3 | | | | |
| Ranges | 2 | 3 | 1 | 1 |
| Sample Conc | 43.01 | .17 | 3.16 | 7.41 |
| Ambient Conc | 6.58 | .05 | .25 | 3.64 |
| Mass | 3.35 | 171.43 | .36 | .17 |
| Grams/mile | .94 | 48.11 | .10 | .05 |
| Fuel Consumption (l/100 km) | 1.31 | | | |
| Composite Grams/mile | 1.39 | 52.40 | .09 | .11 |
| Fuel Consumption (l/100 km) | 1.45 | | | |
| Quality Control Printout | | | | |
| Meter Readings | | | | |
| Bag 1 | | | | |
| Pre zero | .62 | −.14 | −1.08 | .43 |
| MFC Reading | 2.00 | 1.97 | 3.98 | 4.00 |
| Pre Span | 90.32 | 90.46 | 87.62 | 91.23 |
| MFC Reading | 2.00 | 1.97 | 3.98 | 4.00 |
| Raw Samp | 64.48 | 13.71 | 23.65 | 33.34 |
| MFC Reading | 2.00 | 1.97 | 3.98 | 4.00 |
| Raw Amb | 5.96 | 3.23 | .32 | 5.58 |

A comparison of the test results reported in Examples 1, 2, 3 and 4 above is set out in the following table:

SCHEDULE 'A'

Summary of Tests conducted on 1996 Pontiac Sunbird on Mar. 11, 12 and 13, 1997. Units are grams per mile.

| | CO | $CO_2$ | NOx | HC |
|---|---|---|---|---|
| Example 1 Raw Exhaust | 11.60 | 334.25 | 2.29 | 1.04 |
| Example 2 Apparatus Only | 7.77 | 46.41 | .63 | .67 |
| Example 3 Catalytic Converter Only | 1.76 | 361.73 | .22 | .15 |
| Example 4 Catalytic Converter & Apparatus | 1.38 | 52.40 | .09 | .11 |

The above description is intended in an illustrative rather than a restrictive sense. Variations may be apparent to appropriately skilled persons without departing from the spirit and scope of the invention as defined by the claims set out below.

We claim:

1. An apparatus for removing gasses and particulate matter from internal combustion engine exhaust, said apparatus comprising:

a heat exchanger fluidly communicating with an automobile exhaust system for cooling exhaust passing therethrough and condensing at least a portion of said exhaust into a liquid condensate;

a fluid separator fluidly communicating with said heat exchanger for separating said condensate from non-condensed gasses and for removing at least some of said particulate matter from said exhaust;

a holding tank fluidly communicating with said fluid separator for receiving and holding said condensate;

a first chemical reactor fluidly communicating with at least one of said fluid separator and said holding tank for exposing said condensate to a neutralizing agent to neutralize any acids in said condensate;

at least one second chemical reactor fluidly communicating with said fluid separator for receiving non-condensed gasses from said fluid separator and reacting carbon monoxide and carbon dioxide in said non-condensed gasses with a substance which absorbs carbon monoxide and carbon dioxide and which removes said particulate matter from said non-condensed gasses; and, an outlet fluidly communicating with said second chemical reactor for venting any remaining gasses to atmosphere.

2. An apparatus as claimed in claim 1 wherein:

said exhaust is cooled by said heat exchanger to a temperature of from about 5° to about 10° C. (approx. 40°–50° F.);

said neutralizing agent in said first chemical reactor is sodium carbonate;

said substance in said second chemical reactor is an alkali metal hydroxide in solution with water.

3. An apparatus as claimed in claim 2 wherein said heat exchanger fluidly communicates with and transfers heat from said exhaust into at least one of a radiator, an engine cooling system and refrigerant in an air conditioning system associated with an automobile to which said apparatus is connected.

4. An apparatus according to claim 3 wherein each said at least one second chemical reactor includes:

an inlet pipe for receiving said non-condensed gasses from said fluid separator and directing said gasses to a bottom part of a first stage through a diffuser outlet at a lower end of said inlet pipe;

said first stage fluidly communicating at a top to a top of second stage through a transfer pipe which receives treated gas from said first stage and directs it into a bottom part of said second stage through a diffuser outlet at a lower end of said transfer pipe;

a plurality of perforated baffles extending across said first and second stages about respective of said inlet and transfer pipes a lowermost of said perforated baffles in each said first and second stage being generally horizontally disposed with remaining of said perforated baffles being arranged one above another in a zig-zag configuration;

each of said baffles having a perforated area equal to at least 1¾ times an inside cross sectional area of respective of said inlet and transfer pipes;

lower of said baffles having smaller perforations than higher of said baffles;

said second stage fluidly communicating at a top thereof with a final stage through a final stage inlet, said final stage having a downwardly extending partition to define adjacent first and second passages fluidly communicating at a bottom of said third stage;

said second passage having an exit aperture adjacent a top thereof; and, said final stage inlet fluidly communicating with said exit aperture;

said second reactor further having a coolant jacket extending around a base thereof; and, said substance is a liquid having a level in each said first and second stage above said diffuser and below said lowermost perforated baffles.

5. An apparatus as claimed in claim 4 wherein a deflector baffle is attached below said transfer pipe and said third stage inlet to deflect gas away from said transfer pipe and said third stage inlet.

6. An apparatus as claimed in claim 3 wherein said substance in said second chemical reactor is a solution of about 50 wt. % potassium hydroxide in water.

7. An apparatus as claimed in claim 4 wherein said substance in said second chemical reactor is a solution of about 50 wt. % potassium hydroxide in water.

8. An apparatus as claimed in claim 5 wherein said substance in said second chemical reactor is a solution of about 50 wt. % potassium hydroxide in water.

9. An apparatus as claimed in claim 4 further comprising a chemical replenisher having a chemical outlet communicating with an interior of said chemical reactor below said lowermost of said perforated baffles for introducing, at predetermined intervals, a predetermined amount of a concentrated version of said substance into said substance in said second chemical reactor to replace a reacted portion of said substance.

10. An apparatus as claimed in claim 7 further comprising a chemical replenisher having a chemical outlet communicating with an interior of said chemical reactor below said lowermost of said perforated baffles for introducing, at predetermined intervals, a predetermined amount of a concentrated version of said substance into said substance in said second chemical reactor to replace a reacted portion of said substance.

11. A process for removing gasses and particulate matter from an automobile exhaust, said process comprising the steps of:

i) cooling said exhaust to a temperature of about from 5° to about 10° C. to condense a portion of said exhaust to form a condensate and a non-condensed gas;

ii) reacting said condensate and said non-condensed gas with a neutralizing agent to neutralize any acids in said condensate;

iii) separating said condensate and said particulate matter from said non-condensed gas;

iv) storing said condensate in a holding tank;

v) exposing said non-condensed gas to a substance which removes said particulate matter therefrom and which absorbs carbon monoxide and carbon dioxide to remove said particulate matter, carbon monoxide and carbon dioxide from said non-condensed gas to form a treated exhaust gas;

vi) venting said treated exhaust gas to atmosphere.

12. A process as claimed in claim 11 wherein said substance in step v) is an alkali metal hydroxide in solution with water.

13. A process as claimed in claim 12 wherein step i) is carried out in a heat exchanger which transfers heat from said exhaust into at least one of coolant circulating through a radiator, and refrigerant in an air-conditioning system associated with an automobile from which said internal combustion engine exhaust emanates;

said neutralizing agent in step ii) is sodium carbonate;

steps ii) and part of step iii) are carried out in a first chemical reactor; and, a part of step iii) and step v) are carried out in a second chemical reactor.

14. A process as claimed in claim 13 wherein said substance in step v) is a solution of about 50 wt. % potassium hydroxide in water.

15. A process as claimed in claim 12 wherein said substance is periodically replenished by adding a predetermined amount of a concentrated version of said substance to said substance to replace a reacted portion of said substance.

* * * * *